(12) United States Patent (10) Patent No.: US 12,560,973 B2

Cai (45) Date of Patent: Feb. 24, 2026

(54) PROTECTIVE COVER FOR ELECTRONIC DEVICES

(71) Applicant: Dongguan Kaishuo Electronics Technology Co., Ltd., Dongguan (CN)

(72) Inventor: Jing Cai, Dongguan (CN)

(73) Assignee: Dongguan Kaishuo Electronics Technology Co., Ltd., Dongguan (CN)

( * ) Notice: Subject to any disclaimer, the term of this patent is extended or adjusted under 35 U.S.C. 154(b) by 143 days.

(21) Appl. No.: 18/433,501

(22) Filed: Feb. 6, 2024

(65) Prior Publication Data

US 2025/0190025 A1 Jun. 12, 2025

(30) Foreign Application Priority Data

Dec. 12, 2023 (CN) .......................... 202323382858.2

(51) Int. Cl.
G06F 1/16 (2006.01)

(52) U.S. Cl.
CPC .......... G06F 1/1656 (2013.01); G06F 1/1681 (2013.01); G06F 1/1626 (2013.01); G06F 1/1669 (2013.01)

(58) Field of Classification Search
CPC .... G06F 1/1607; G06F 1/1613; G06F 1/1615; G06F 1/1618; G06F 1/1628; G06F 1/1629
See application file for complete search history.

(56) References Cited

U.S. PATENT DOCUMENTS

| | | | | |
|---|---|---|---|---|
| 8,573,394 | B2 * | 11/2013 | Ahee | G06F 1/1662 |
| | | | | 206/320 |
| 8,907,752 | B2 * | 12/2014 | Wodrich | H02J 50/60 |
| | | | | 335/304 |
| 9,116,550 | B2 * | 8/2015 | Siddiqui | G06F 3/0219 |
| 9,729,685 | B2 * | 8/2017 | Ive | A45C 11/00 |
| 9,778,705 | B2 * | 10/2017 | Esmaeili | H01R 13/2407 |
| 10,216,232 | B1 * | 2/2019 | Zhu | G06F 1/1656 |
| D1,010,658 | S * | 1/2024 | Chu | D14/440 |
| 2015/0195931 | A1 * | 7/2015 | Roberts | A45C 11/00 |
| | | | | 220/810 |
| 2016/0018854 | A1 * | 1/2016 | Yu | G06F 1/1632 |
| | | | | 361/679.08 |
| 2020/0190877 | A1 * | 6/2020 | Zhai | G06F 1/1669 |
| 2020/0301480 | A1 * | 9/2020 | Miller | G06F 1/1662 |
| 2022/0155820 | A1 * | 5/2022 | Jeanneau | G06F 1/1656 |
| 2023/0195176 | A1 * | 6/2023 | Perelli | G06F 1/1618 |
| | | | | 361/679.01 |
| 2024/0049850 | A1 * | 2/2024 | Peng | G06F 1/1681 |
| 2024/0407516 | A1 * | 12/2024 | Jiang | G06F 1/1628 |

* cited by examiner

*Primary Examiner* — Anthony Q Edwards

(57) ABSTRACT

A protective cover for electronic devices is provided, which includes a first support, a second support, and a rotation assembly; a plurality of sub-supports of the first support are connected in a swinging manner and form a plurality of forms; at least one of the sub-supports is used to support the electronic device. Through the swing connection between the plurality of sub-supports, the form change of the first support is achieved, so as to support the electronic device in multiple dimensions. Furthermore, the rotation assembly is arranged between the second support and the first support, and connected to the second support and the first support. The second support and the first support rotate with each other under the driving of the rotation assembly, so as to adjust the angle between the second support and the first support.

9 Claims, 9 Drawing Sheets

100

11

10

20

30

32          31

200

PROTECTIVE COVER FOR ELECTRONIC DEVICES

CROSS-REFERENCE

This application claims to the benefit of priority from Chinese Application No. 202323382858.2 with a filing date of Dec. 12, 2023. The content of the aforementioned applications, including any intervening amendments thereto, are incorporated herein by reference.

TECHNICAL FIELD

The present invention relates to the technical field of the protective cover for electronic devices, in particular to a protective cover for electronic devices.

BACKGROUND

With the development of science and technology, electronic devices are used in daily life for users to watch movies and news. And a protective cover for electronic devices is used to support or protect electronic devices. The protective cover of electronic devices is used to connect the first support and the second support, and the first support is used to support electronic devices, at this time, the first support swings relative to the second support. The first support is used as a tablet stand and cannot undergo any form change, which affects the compatibility of the protective cover of the electronic device for the use of the electronic device at various angles.

SUMMARY

The objective of the present invention is to provide a protective cover for electronic devices. Through the swinging connection between a plurality of sub-supports, the form change of the first support is realized, so as to support the electronic devices in multiple dimensions and facilitate its use at a plurality of angles. Furthermore, the rotation assembly is arranged between the second support and the first support, and connected to the second support and the first support. The second support and the first support rotate with each other under the driving of the rotation assembly, thereby adjusting the angle between the second support and the first support, so as to adjust the angle between the electronic device and the first support, improving the compatibility of the protective cover for the electronic devices with the electronic device under various angles of use.

To achieve the above objective, the present invention provides the following technical solutions:

A protective cover for electronic devices, configured to support or protect electronic devices, including:

a first support, wherein the first support includes a plurality of sub-supports, the plurality of sub-supports are connected in a swinging manner and form a plurality of forms, and at least one of the sub-supports is configured to support the electronic devices;

a second support, wherein the second support is arranged on one side of the first support, and the second support is connected to a keyboard or a touch screen;

a rotation assembly, wherein the rotation assembly is arranged between the second support and the first support, and connected to the second support and the first support; and the second support and the first support rotate with each other under a driving of the rotation assembly.

Optionally, two adjacent sub-supports are hinged with each other and capable of being opened, flatted, and folded; the two adjacent sub-supports are adjusted in angle under human action; and the sub-supports at a top are used to support electronic devices, and forms a fixed form with a rest of the sub-supports.

Optionally, the sub-supports at the top are connected to an adsorption member;

the adsorption member is embedded in the sub-support and magnetically adsorbs with the electronic devices or a casing connected to the electronic devices;

alternatively, the adsorption member is arranged on a surface of the sub-support, and is subjected to negative pressure adsorption or adhesive adsorption to the electronic device 200 or to the casing connected to the electronic devices.

Optionally, when the two adjacent sub-supports are in a flatted state, the first support swings towards the second support driven by the rotation assembly, so that the first support covers the second support and clamps the electronic devices with the second support to protect the electronic devices.

Optionally, the sub-supports at the top are connected to a cover member, the cover member is swingably connected to the sub-supports, and the cover member is connected to the second support when the first support and the second support are close to each other;

the cover member is connected to the sub-supports through a leather sleeve and is capable of swinging relative to the sub-supports based on a flexible force of the leather sleeve; the cover member is magnetically connected, buckled or adsorbed to the second support, and a front side of the cover member is attached to the second support;

alternatively, the cover member is magnetically connected, buckled or adsorbed to the first support, and a reverse side of the cover member is attached to the first support.

Optionally, the rotation assembly includes a connection member, a rotation member, and a damping member;

the connection member is directly or indirectly connected to the second support;

the rotation member is rotatably connected to the connection member, and is directly or indirectly connected to the first support;

the damping member is arranged between the rotation member and the connection member, and applies damping force to the rotation member.

Optionally, the damping member is sleeved on the rotation member, one end of the damping member is connected to the connection member, and the other end is directly or indirectly connected to the rotation member, and applies the damping force to the rotation member;

as an angle between the first support and the second support gradually decreases, the damping member is gradually compressed or twisted, and the damping force exerted by the damping member on the rotation member is increased;

alternatively, as an included angle between the first support and the second support gradually decreases, the damping force exerted by the damping member on the rotation member remains unchanged.

Optionally, the rotation assembly further includes a locking member, the locking member is sleeved on the rotation member and is rotated with a rotation of the rotation member;

the locking member is arranged on a side of the connection member and arranged corresponding to the connection member, and the locking member is interlocked with the connection member to maintain the angle between the first support and the second support.

Optionally, the connection member is provided with a limit block;

the rotation member passes through the connection member, and a circumferential side wall of the rotation member is provided with a raised block, the raised block and the limit block are at the same side, and the raised block comes into contact with the limit block as the rotation member rotates;

the rotation member is limited by the connection member when the raised block contacts the limit block.

Optionally, the included angle between the first support and the second support is in a range of 0°-360°.

Compared with existing technologies, the advantageous effects of the present invention are as following:

The present invention provides a protective cover for electronic devices, which includes a first support, a second support, and a rotation assembly; the first support includes a plurality of sub-supports, and the plurality of sub-supports are connected in a swinging manner and form a plurality of forms; and at least one of the sub-supports is used to support the electronic devices. The form change of the first support is achieved through the swinging connection between the plurality of sub-supports, thereby supporting the electronic devices in multiple dimensions and facilitating the use of electronic devices at a plurality of angles. Furthermore, the rotation assembly is arranged between the second support and the first support, and connected to the second support and the first support. The second support and the first support rotate with each other under the driving of the rotation assembly, so as to adjust the angle between the second support and the first support, thereby adjusting the angle between the electronic device and the first support, improving the compatibility of the protective cover of the electronic device with the electronic device in various angles of use. In addition, the second support is arranged on one side of the first support, and the second support is connected to a keyboard or touch screen for the convenience of integrating a keyboard or touch screen, thereby forming a communicating connection between the keyboard or touch screen and electronic devices, improving the use effect of the protective cover.

BRIEF DESCRIPTION OF THE DRAWINGS

In order to provide a clearer illustration of the technical solution in the embodiments of the application, a brief introduction will be given below to the accompanying drawings required in the description of the embodiments. It is apparent that the drawings described below are only some embodiments of the application. For those skilled in the art, other drawings can be obtained based on these drawings without creative labor.

In order to provide a more comprehensive understanding of the application and its advantageous effects, the following will be illustrated in conjunction with the accompanying drawings. The same reference numbers in the following description represent the same parts.

REFERENCE NUMBERS IN THE DRAWINGS

100—the protective cover of the electronic devices; 200—electronic device;

10—first support; 11—sub-support;

20—rotation assembly; 21—connection member; 211—clamping member; 212—limit block; 2111—second clamping slot; 22—rotation member; 221—raised block; 222—insertion part; 23—damping member; 24—locking member, 241—first locking part; 242—second locking part; 25—first mounting member; 251—first tube body; 2511—through hole; 26—second mounting member; 261—accommodating chamber; 262—clamping slot; 27—gasket; 28—nut; 29—elastic piece;

30—second support; 31—keyboard 31; 32—touch screen;

40—cover member.

DETAILED DESCRIPTION OF THE EMBODIMENTS

The following will provide a clear and complete description of the technical solution in the embodiments of the application, in conjunction with the accompanying drawings. It is apparent that the described embodiments are only some part of the embodiments of the application, not all embodiments. Based on the embodiments in the application, all other embodiments obtained by those skilled in the art without creative labor fall within the scope of the application.

Figure 1:
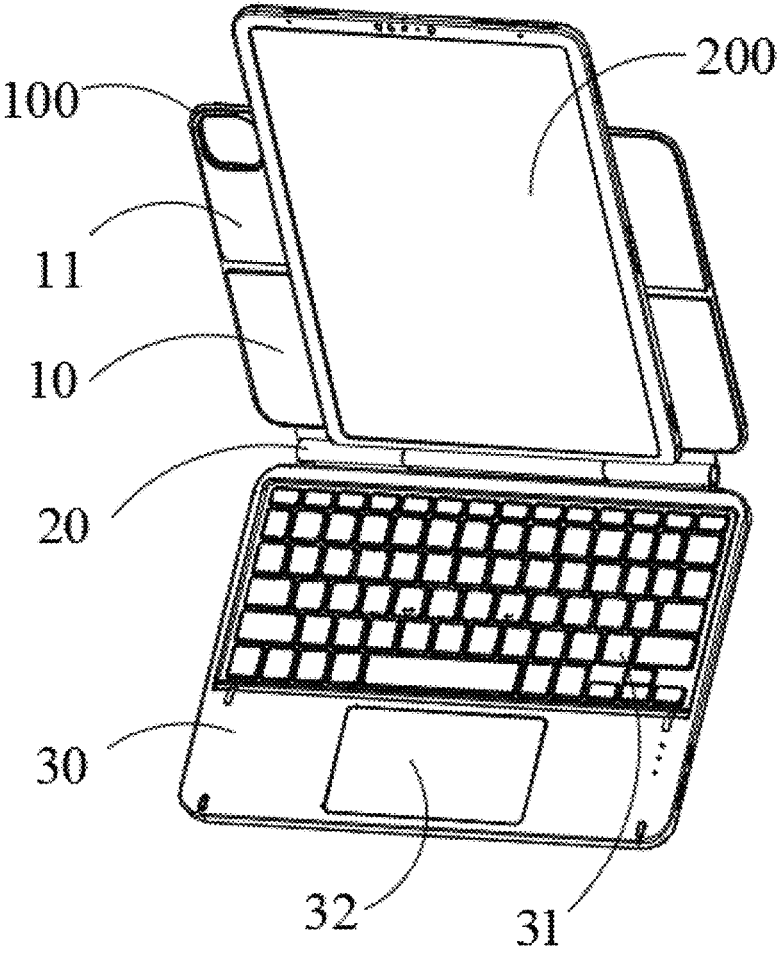
FIG. 1 is a schematic diagram of a protective cover for electronic devices supporting the electronic devices in the embodiment provided in the application.
Figure 2:
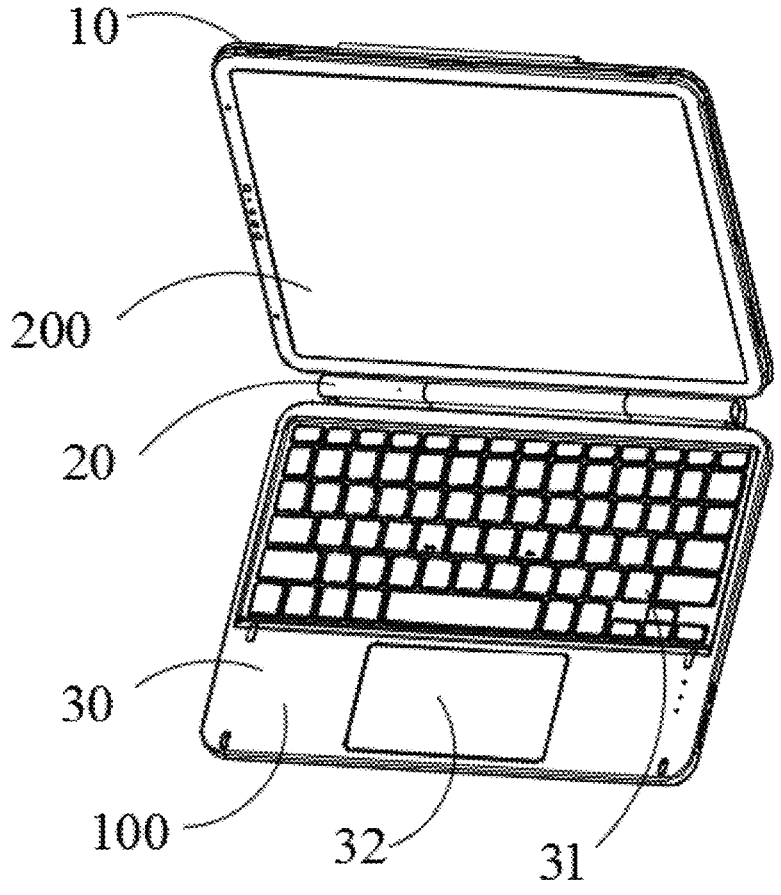
FIG. 2 is another schematic diagram of the protective cover for electronic devices supporting the electronic devices in the embodiment provided in the application.
Figure 3:
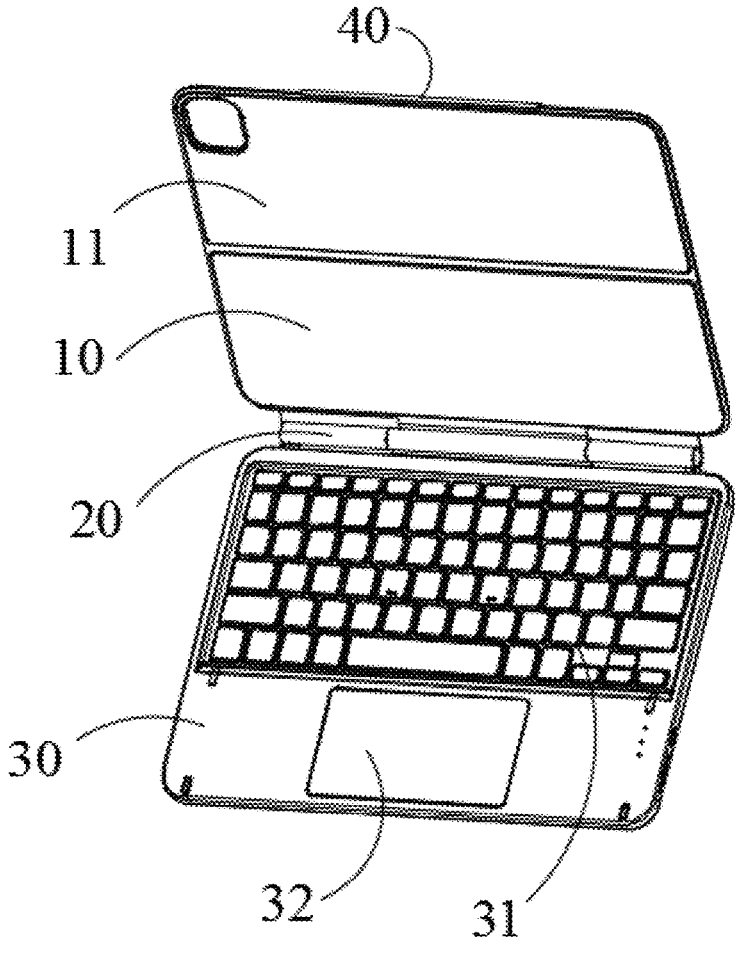
FIG. 3 is a diagram showing a flatting form of the protective cover of the electronic devices in the embodiment provided in the application.
Figure 4:
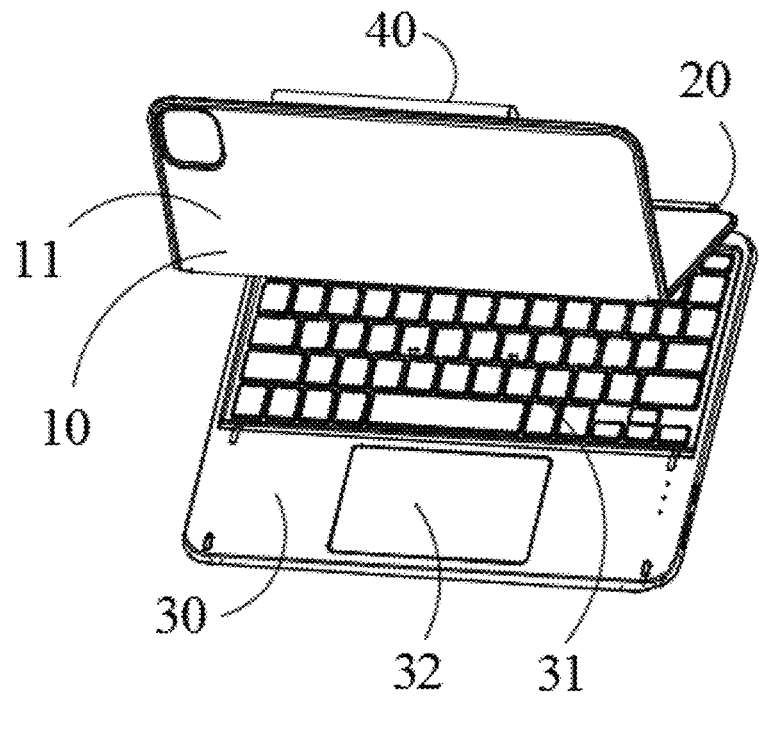
FIG. 4 is a diagram showing an opening form of the protective cover of the electronic devices in the embodiment provided in the application.
Figure 5:
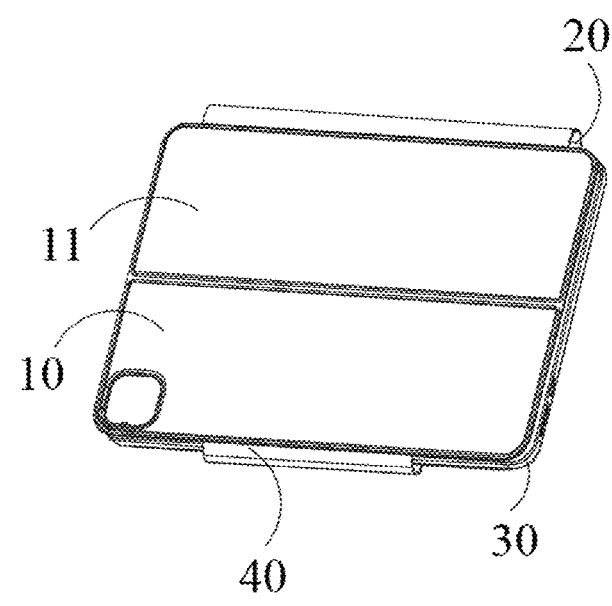
FIG. 5 is a diagram showing a closing form of the protective cover of the electronic devices in the embodiment provided in the application.
Figure 6:
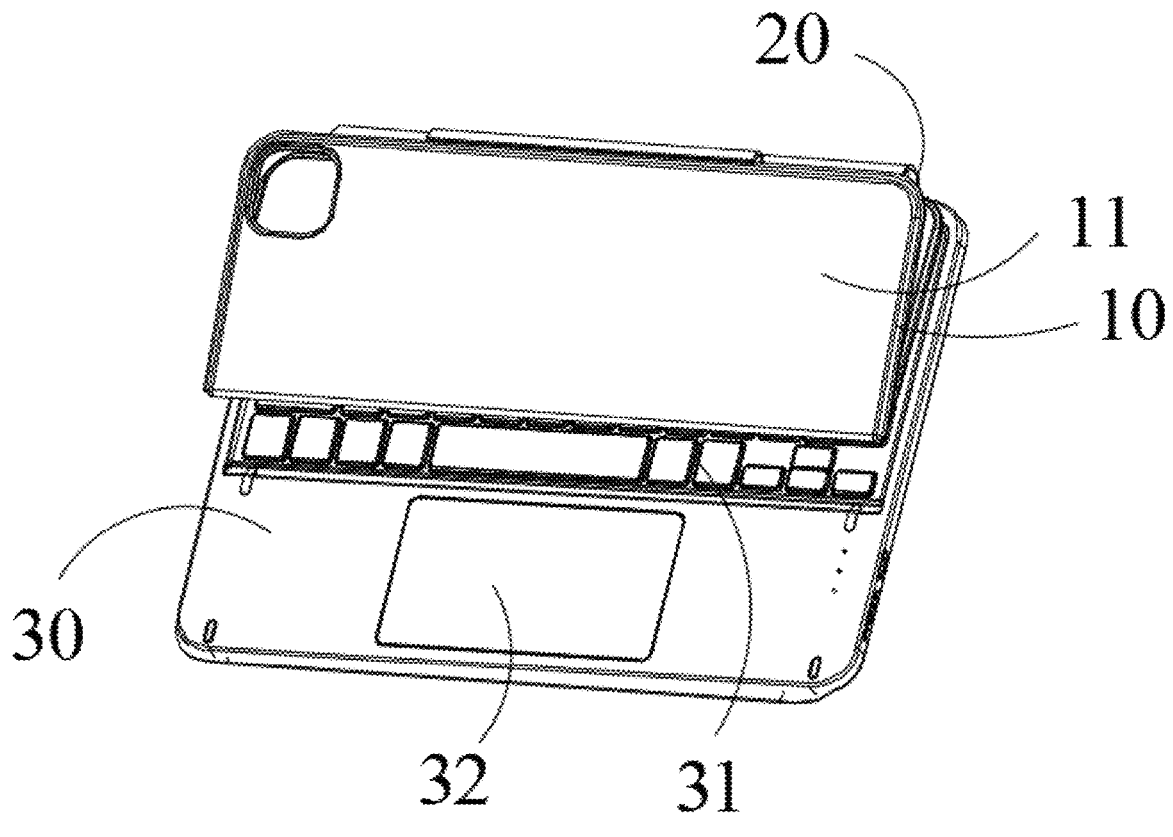
FIG. 6 is a diagram showing a folding form of the protective cover of the electronic devices in the embodiment provided in the application.
Figure 7:
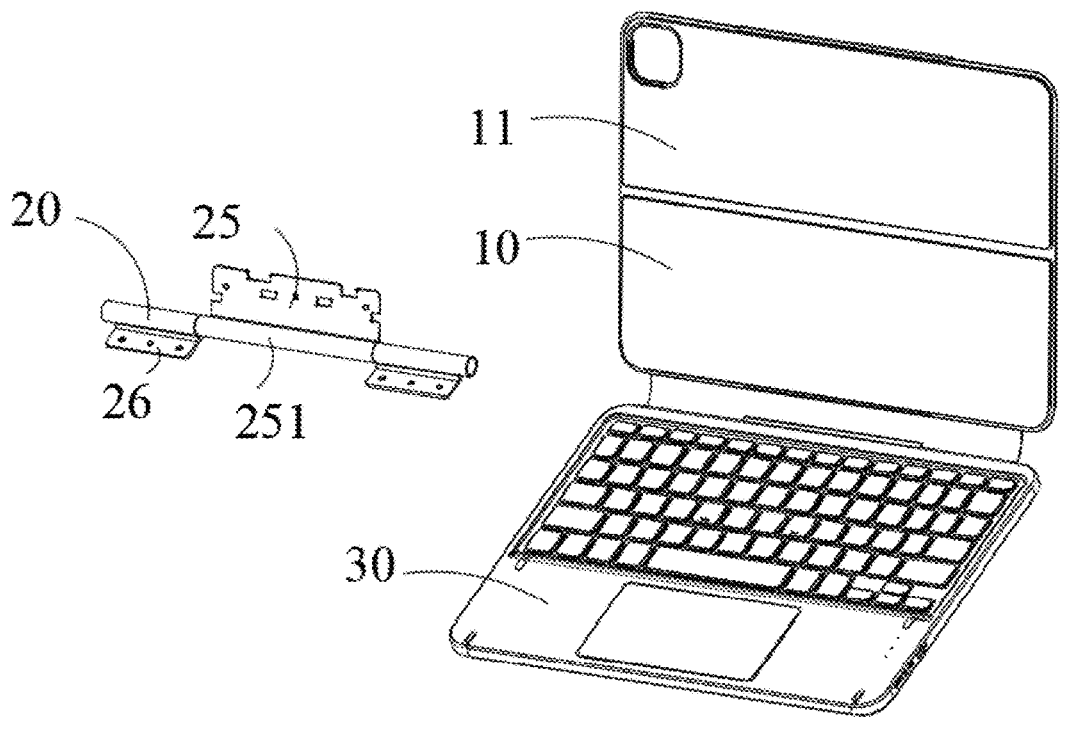
FIG. 7 is an exploded view of FIG. 3.
Figure 8:
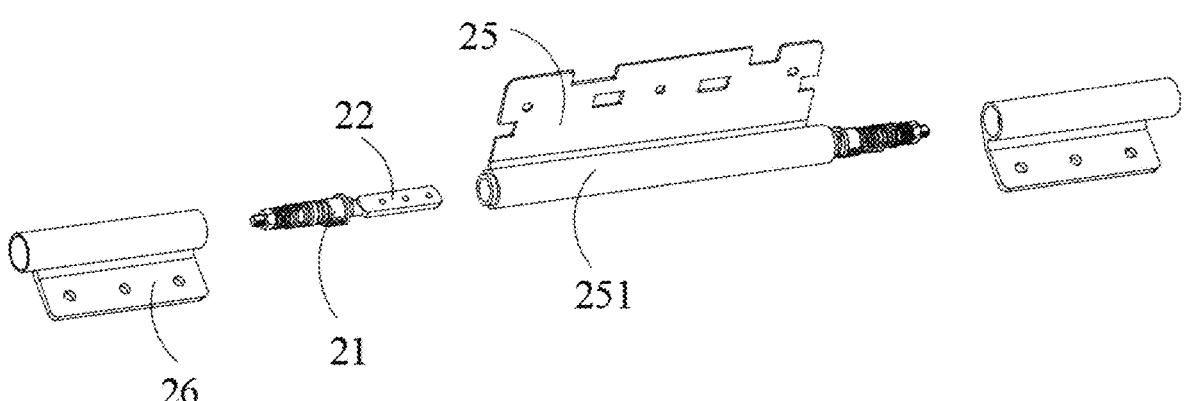
FIG. 8 is an exploded view of the rotation assembly in the protective cover of the electronic devices in the embodiment provided in the application.
Figure 9:
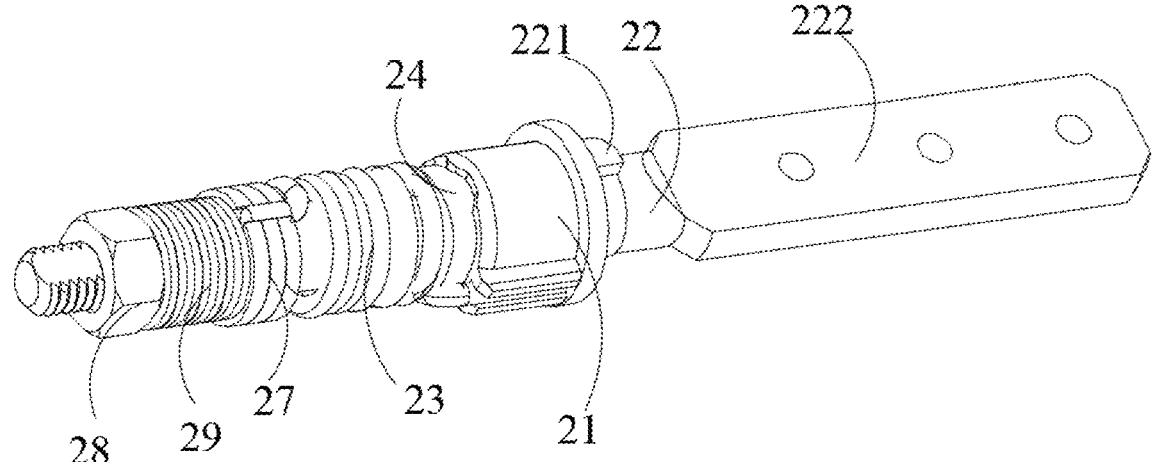
FIG. 9 is a schematic diagram of the connection between the connection members in the protective cover of the electronic devices in the embodiment provided in the application.
Figure 10:
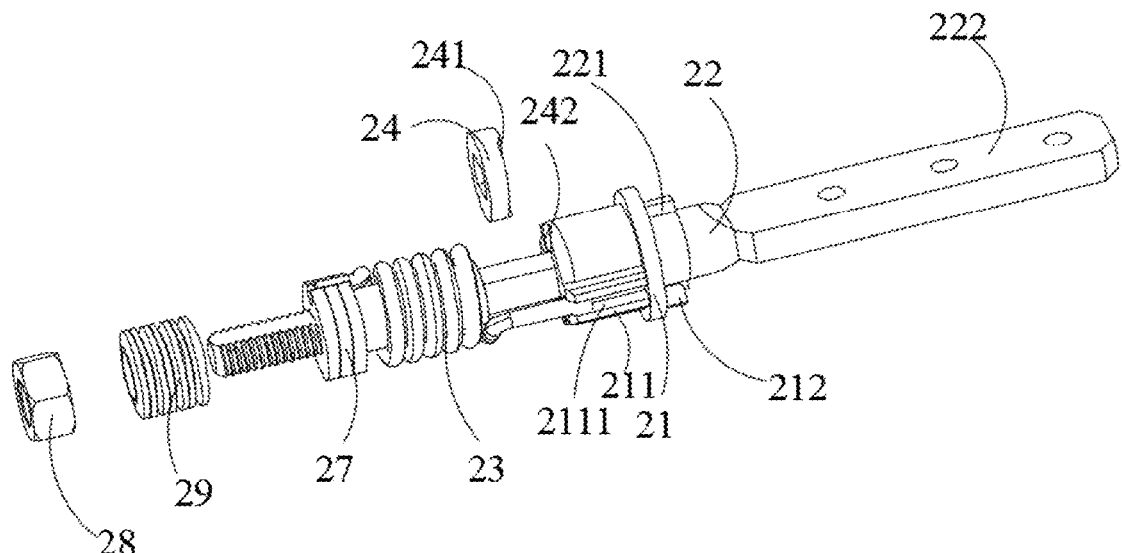
FIG. 10 is an exploded view of FIG. 9.
Figure 11:
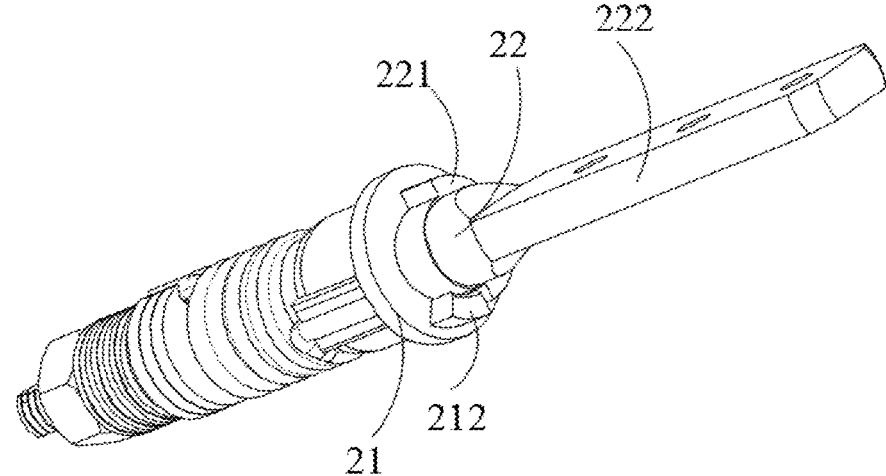
FIG. 11 is another schematic diagram of the connection member in the protective cover of the electronic devices in the embodiment provided in the application.
Figure 12:
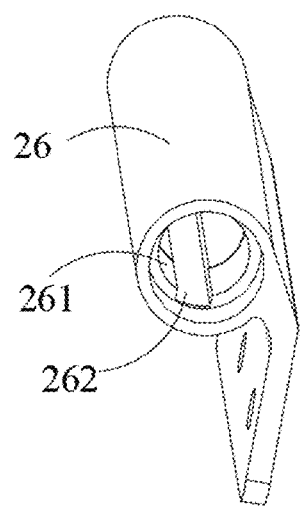
FIG. 12 is a schematic diagram of the second mounting member in the protective cover of the electronic devices in the embodiment provided in the application.
Figure 13:
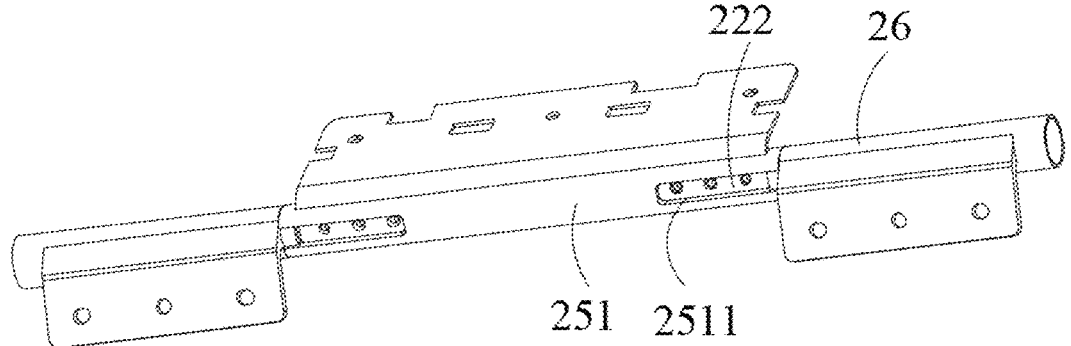
FIG. 13 is a schematic diagram of the through hole in the protective cover of the electronic devices in the embodiment provided in the application.

Please refer to FIG. 1-FIG. 13, the embodiment of the application provides a protective cover for electronic devices 100, which is used to support or protect the electronic device 200. The electronic device 200 may be an electronic plane-table or a mobile terminal. The protective cover for electronic devices 100 includes a first support 10, a second support 30, and a rotation assembly 20. The rotation assembly 20 is arranged between the second support 30 and the first support 10, and connected with the second support 30 and the first support 10. In the present embodiment, the rotation assembly 20 serves as a rotating module between the second support 30 and the first support 10, and drives the first support 10 to rotate relative to the second support 30.

In the embodiment of the application, the first support 10 is located above the second support 30. The first support 10 includes a plurality of sub-supports 11. The plurality of sub-supports 11 are connected in a swinging manner and form a plurality of forms. The plurality of forms include a closing form, a folding form, an opening form, a flatting form, and forms at different angles.

Wherein, the plurality of sub-supports 11 are hinged with each other, the two adjacent sub-supports 11 are provided with hinges, and are hinged through the hinges, so as to facilitate the swing of the two adjacent sub-supports 11, thereby adjusting the angle between the two adjacent sub-supports 11 and realizing the switching between different forms. In the present embodiment, the sub-supports 11 at the top are used to support the electronic device 200, so as to facilitate the orientation adjustment of the electronic device 200 by adjusting the angle of the sub-support 11 at the top, so that the use of electronic device 200 at different angles can be achieved. Optionally, at least one sub-support 11 is used to support the electronic device 200.

Furthermore, a leather sleeve is arranged between the two adjacent sub-supports 11, the angle is adjusted through the flexible action of the leather sleeve. Based on the leather sleeve, the relative swing of the two adjacent sub-supports 11 can be realized, so that the angle between the two adjacent sub-supports 11 can be adjusted to switch different forms. At this time, the sub-supports 11 at the top are used to support the electronic device 200, so as to facilitate the orientation adjustment of the electronic device 200 by adjusting the angle of the sub-support 11 at the top. Such that the use of electronic device 200 at different angles can be realized.

Therefore, the two adjacent sub-supports 11 are hinged with each other, and are capable of being opened, flatted, or folded. The two adjacent sub-supports 11 are adjusted in angle under human action, so the form change of the first support 10 is realized through the swinging connection between the plurality of sub-supports 11, thereby supporting the electronic device 200 in multiple dimensions to facilitate the electronic device use at a plurality of angles. The sub-supports 11 at the top is used to support the electronic device 200, and forms a fixed form with the rest of the sub-supports, so as to maintain the angle between the two adjacent sub-supports 11.

In the embodiment of the application, the sub-supports 11 at top are connected to an adsorption member, which is connected to the sub-supports 11 and arranged inside or outside the sub-supports 11.

The adsorption member is embedded in the sub-supports 11 and magnetically adsorbs with the electronic device 200 or the casing connected to the electronic device 200. At this time, the adsorption member serves as a magnetic member and is positioned inside the sub-supports 11. The adsorption member magnetically adsorbs the electronic device 200 through the magnetic force, so that sub-supports 11 at the top can fix the electronic device 200 through the adsorption member, thereby ensuring the use effect of the protective cover for electronic devices 100. Optionally, the adsorption member is a magnet.

Furthermore, the adsorption member is arranged on the surface of the sub-supports 11, and is subjected to negative pressure adsorption or adhesive adsorption to the electronic device 200 or to a casing connected to the electronic device 200. At this time, the adsorption member is located on the outside of the sub-supports 11, and is subjected to negative pressure adsorption or adhesive adsorption to the electronic device 200 or to a casing connected to the electronic device 200. Through negative pressure adsorption or adhesive adsorption, the sub-supports 11 are fixed to the electronic device 200, so that the sub-supports 11 at the top is fixed to the electronic device 200 through the adsorption member, thereby ensuring the use effect of the protective cover for electronic devices 100. Optionally, the adsorption member is a suction cup or an adhesive sticker.

In the embodiment of the application, the two adjacent sub-supports 11 are adjusted in angle under human action to ensure that the two adjacent sub-supports 11 are in a flatted state. Therefore, when the two adjacent sub-supports 11 are in a flatted state, the first support 10 swings towards the second support 30 under the driving of the rotation assembly 20, so that the first support 10 covers the second support 30 and clamps the electronic device 200 with the second support 30 to protect the electronic device 200.

At this time, the first support 10 is gradually close to the second support 30 and drives the electronic device 200 gradually close to the second support 30, and the display of the electronic device 200 faces the second support 30. The first support 10 and the second support 30 are arranged above and below the electronic device 200 respectively, and wrap the electronic device 200 in an up and down direction to achieve outer protection of the electronic device 200.

In addition, the sub-supports at top 11 are connected to a cover member 40, the cover member 40 is swingingly connected to the sub-supports 11, and connected to the second support 30 when the first support 10 and the second support 30 are close to each other. At this time, the cover member 40 is connected to the sub-supports 11 through a leather sleeve and swings relative to the sub-supports 11 based on the flexible force of the leather sleeve, so that the cover member 40 can swing towards the second support 30 under the action of the leather sleeve, thereby approaching the second support 30, until the cover member 40 is connected to the second support 30.

The following description is for the connection between the cover member 40 and the second support 30. The cover member 40 is magnetically connected, buckled, or adsorbed with the second support 30. At this time, the front of the cover member 40 is attached to the second support 30, so that the cover member 40 is connected between the first support 10 and the second support 30, and the first support 10 and the second support 30 are closed-loop connected. The cover member 40 is located on the outer side of the electronic device 200 to prevent the electronic device 200 from detaching outward, ensuring the use effect of the protective cover for electronic devices 100.

In addition, when the first support 10 is away from the second support 30, the cover member 40 is magnetically connected, buckled or adsorbed with the first support 10. The reverse side of the cover member 40 is attached to the first support 10, so that the cover member 40 is fixed to the first support 10 and is on the side of the first support 10 back to the electronic device 200, thereby protecting the storage of the cover member 40, avoiding the free swing of the cover member 40, and making full use of the space on the side of the first support 10 back to the electronic device 200.

In the embodiment of the application, the second support 30 is arranged on one side of the first support 10. At this time, the second support 30 is arranged below the first support 10 and connected to a keyboard 31 or a touch screen 32 to facilitate the integration of the keyboard 31 or touch screen 32, thereby communicating and connecting the keyboard 31 or the touch screen 32 with the electronic device 200, and improving the use effect of the protective cover.

In the embodiment of the application, the rotation assembly 20 is arranged between the second support 30 and the first support 10, and is connected to the second support 30 and the first support 10. The second support 30 and the first support 10 rotate with each other under the driving of the rotation assembly 20. At this time, the second support 30 and the first support 10 rotate with each other under the driving of the rotation assembly 20, so as to adjust the angle between the second support 30 and the first support 10, thereby adjusting the angle between the electronic device 200 and the first support 10, and improving the compatibility of the the protective cover for electronic devices 100 with the electronic device 200 under various angles of use.

Wherein, the rotation assembly 20 includes a connection member 21, a rotation member 22, and a damping member 23. The connection member 21 is directly or indirectly connected to the second support 30; the rotation member 22 is rotatably connected to the connection member 21 and directly or indirectly connected to the first support 10; and the damping member 23 is arranged between the rotation member 22 and the connection member 21, and applies damping force to the rotation member 22.

At this time, the damping member 23 is arranged between the rotation member 22 and the connection member 21, and applies damping force to the rotation member 22. The first support 10 rotates and reduces the included angle driven by the rotation member 22. Meanwhile, the first support 10 is subjected to the damping force of the damping member 23 to decelerate, so as to achieve the damping force applied by the damping member 23 to the first support 10 during the process of reducing the included angle, reducing the rotational speed of the first support 10 towards the second support 30, and the first support 10 is covered the second support 30 slowly.

Thus, the damping member 23 serves as a damping generator and passively outputs damping force with the rotation of the first support 10, so as to apply the damping force to the first support 10, therefore the included angle between the first support 10 and the second support 30 is in a reduction stage. Optionally, the damping member 23 is a torsion spring, and the torsion spring is in a pre-tightening state.

While the included angle between the first support 10 and the second support 30 is in the expansion stage, the first support 10 gradually moves away from the second support 30 along the axial direction, the damping member 23 is in the releasing state and does not exert the damping force on the first support 10, thereby ensuring that the first support 10 is opened with respect to the second support 30 without the damping force, ensuring that the first support 10 is opened with respect to the second support 30 in a smooth manner, and thereby realizing that the first support 10 carries out a smooth opening to the second support 30.

In the embodiment of the application, the damping member 23 is sleeved on the rotation member 22 and acts on the rotation member 22 and the connection member 21. At this time, one end of the damping member 23 is connected to the connection member 21, the other end is directly or indirectly connected to the rotation member 22, and applies damping force to the rotation member 22, thereby applying damping force to the first mounting member 25 connected by the rotation member 22.

Therefore, as the included angle is gradually reduced, the damping member 23 is gradually compressed or twisted, and the damping force exerted by the damping member 23 on the rotation member 22 increases, thereby gradually increasing the damping force, which is further manifested in the reduction of the rotational speed of the first support 10, improving the use experience of the first support 10.

In another embodiment of the application, the damping force exerted by the damping member 23 on the rotation member 22 is unchanged as the included angle is gradually narrowed, at this time, the damping member 23 is still in a loosened state and has not come to a pre-tightening state, so that the damping force of the damping member 23 is relatively small, and does not undergo a large change due to the narrowing of the included angle, thereby realizing that the damping force exerted by the damping member 23 on the rotation member 22 is unchanged.

In the embodiment of the application, the rotation assembly 20 further includes a locking member 24. The locking member 24 sleeves on the rotation member 22 and rotates with the rotation of the rotation member 22, at this time, the locking member 24 is provided with a first square hole and pierced through the square portion of the rotation member 22, so as to facilitate the locking member 24 to be fixedly connected to the rotation member 22, which ensures the synchronized rotation of the locking member 24 and the rotation member 22.

At this time, the locking member 24 is arranged on one side of the connection member 21 and arranged relative to the connection member 21. The locking member 24 is interlocked with the connection member 21, and the angle between the first support 10 and the second support 30 is maintained through the locking between the locking member 24 and the connection member 21. When the locking member 24 is interlocked with the connection member 21, the locking force between the locking member 24 and the connection member 21 is greater than the damping force of the damping member 23, avoiding the rebound of the first support 10 under the force of the damping element 23, so that the autonomous resetting of the angle of the first support 10 relative to the second support 30 can be avoided.

Specifically, a first locking part 241 and a second locking part 242 are arranged on two opposite sides between the locking member 24 and the connection member 21. The second locking part 242 is in the connection member 21, there are a plurality of second locking parts 242, the plurality of second locking parts 242 are spaced apart along the circumference of the connection member 21. And the first locking part 241 is in the locking member 24 and is sequentially locked to one of the second locking parts 242 with the rotation of the rotation member 22 to realize the self-locking effect of the first support 10 and the second support 30. Optionally, the first locking part 241 and the second locking part 242 are engagement parts that engage with each other.

In addition, the locking member 24 is between the connection member 21 and the damping member 23. One end of the damping member 23 connected to the connection member 21 avoids the locking member 24, avoiding movement interference between the locking member 24 and the damping member 23. At the same time, the locking member 24 fully utilizes the space between the connection member 21 and the damping member 23, improving the space utilization of the rotation assembly 20.

Furthermore, the circumferential side wall of the damping member 23 can contact the locking member 24 along the circumferential direction of the rotating part 22, so that the compression force can be transmitted to the locking member 24 when the damping member 23 is compressed. Under this force, the locking member 24 is elastically locked with the connection member 21, which ensures the self-locking effect of the first support 10 and the second support 30.

In one embodiment of the application, the connection member 21 is directly or indirectly connected to the second support 30. The rotation member 22 is directly or indirectly connected to the first support 10. At this time, a first mounting member 25 is arranged between the first support 10 and the rotation member 22, and a second mounting member 26 is arranged between the second support 30 and the connection member 21.

The following description is for the connection between the second mounting member 26 and the connection member 21. At this time, the second mounting member 26 is provided with an accommodating chamber 261 and a clamping slot 262. the accommodating chamber is used to accommodate the rotation assembly 20, the clamping slot 262 is communicated with the accommodating chamber 261 and is located on the outer side of the accommodating chamber 261.

The connection member 21 is accommodated in the accommodating chamber 261. The connection member 21 is provided with a clamping member 211, which is clamped in the clamping slot 262, allowing the connection member 21 to be clamped with the second mounting member 26 for a fixed connection between the connection member 21 and the second mounting member 26, ensuring the static arrangement between the connection member 21 and the second mounting member 26.

In addition, the clamping member 211 is provided with a second clamping slot 2111. One end of the damping member 23 connected to the connection member 21 is clamped in the second clamping slot 2111, so that the space of the clamping member 211 is fully utilized. Thus, one end of the damping member 23 that connects to the connection member 21 is accommodated in the second clamping slot 2111, which avoids the movement interference between one end of the damping member 23 that connects to the connection member 21 and the second mounting member 26. At the same time, the damping member 23 avoids the locking member 24. Optionally, the damping member 23 is a torsion spring.

Furthermore, the rotation member 22 is provided with a gasket 27, and one end of the damping member 23 that connects to the rotation member 22 is clamped with the gasket 27. The gasket 27 sleeves on the rotation member 22 and fixedly connected to the rotation member 22, thereby indirectly connecting the rotation member 22 and the damping member 23 through the gasket 27, ensuring that the damping member 23 outputs damping force to the rotation member 22.

In one embodiment of the application, the end of the rotation member 22 is connected to a nut 28, and an elastic piece 29 is arranged between the nut 28 and the gasket 27. At this time, the nut 28 is screwed to the end of the rotation member 22 and moves along the axial direction of the rotation member 22 to adjust the positions of the elastic piece 29 and the nut 28, and the damping member 23 is compressed by the elastic piece 29 and the nut 28. At this time, the damping member 23 is compressed to different degrees through adjusting the position of the threads, thereby adjusting the damping force output from the damping member 23, and realizing the adjustable performance of the damping force, so as to facilitate the application of different scenarios of the damping force and improve the versatility of the rotation shaft assembly.

In one embodiment of the application, the connection member 21 is provided with a limit block 212. The rotation member 22 passes through the connection member 21, and the circumferential side wall of the rotation member 22 is provided with a raised block 221. The raised block 221 and the limit block 212 are at the same side, and the raised block 221 contacts the limit block 212 with the rotation of the rotation member 22. At this time, the rotation of the first mounting portion 25 relative to the second mounting portion 26 is limited through the contact between the raised block 221 and the limit block 212, thereby limiting the rotation angle of the first mounting member 25 relative to the second mounting member 26.

Therefore, when the raised block 221 contacts the limit block 212, the rotation member 22 is limited by the connection member 21, and the range of the included angle between the second mounting portion 26 and the first mounting portion 25 is 0° to 360°, which can be adjusted according to the actual need.

In one embodiment of the application, the rotation member 22 passes through the first mounting member 25 and is connected to the first mounting member 25 through a bushing. The rotation member 22 is provided with an insertion part 222, which passes through the first mounting member 25 and is connected to the first mounting member 25. When the insertion part 222 is connected to the first mounting member 25, the first mounting member 25 is provided with a through hole 2511, and the through hole 2511 exposes at the connection position between the insertion part 222 and the first mounting member 25. At this time, the insertion part 222 is connected to the support portion of the first mounting member 25 by screws, and the through hole 2511 is in the first tube body 251 of the first mounting member 25, and is exposed to the screw between insertion part 222 and the support portion.

In the above embodiments, the descriptions of each embodiment have its own focus. And the part that is not detailed in one embodiment can be seen in the relevant description of other embodiment.

In the description of the application, the terms "first" and "second" are only used for descriptive purposes and cannot be understood as indicating or implying relative importance or implying the quantity of technical features indicated. Therefore, the features limited to "first" and "second" can explicitly or implicitly include one or more features.

The article applies specific embodiments to explain the principles and implementation methods of the application. The above embodiments are only used to help understand the methods and core ideas of the application. Meanwhile, for those skilled in the art, there may be changes in specific implementation methods and application based on the principles of this application, thus, the content of the specification should not be understood as a limitation on the application.

What is claimed is:

1. A protective cover for electronic devices, configured to support or protect electronic devices, comprising:

a first support, wherein the first support comprises a plurality of sub-supports, the plurality of sub-supports are connected in a swinging manner and form a plurality of forms, and at least one of the sub-supports is configured to support the electronic devices;

a second support, wherein the second support is arranged on one side of the first support, and the second support is connected to a keyboard or a touch screen;

a rotation assembly, wherein the rotation assembly is arranged between the second support and the first support, and connected to the second support and the first support; and the second support and the first support rotate with each other under a driving of the rotation assembly;

the rotation assembly comprises a connection member, a rotation member, and a damping member;

the connection member is directly or indirectly connected to the second support;

the rotation member is rotatably connected to the connection member, and is directly or indirectly connected to the first support; and the damping member is arranged between the rotation member and the connection member, and applies damping force to the rotation member.

2. The protective cover for electronic devices according to claim 1, wherein two adjacent sub-supports are hinged with each other and capable of being opened, flatted, and folded; the two adjacent sub-supports are adjusted in angle under human action; and the sub-supports at a top are used to support electronic devices, and forms a fixed form with a rest of the sub-supports.

3. The protective cover for electronic devices according to claim 2, wherein the sub-supports at the top are connected to an adsorption member;

the adsorption member is embedded in the sub-support and magnetically adsorbs with the electronic devices or a casing connected to the electronic devices;

alternatively, the adsorption member is arranged on a surface of the sub-support, and is subjected to negative pressure adsorption or adhesive adsorption to the electronic device or to the casing connected to the electronic devices.

4. The protective cover for electronic devices according to claim 2, when the two adjacent sub-supports are in a flatted state, the first support swings towards the second support driven by the rotation assembly, so that the first support covers the second support and clamps the electronic devices with the second support to protect the electronic devices.

5. The protective cover for electronic devices according to claim 4, wherein the sub-supports at the top are connected to a cover member, the cover member is swingably connected to the sub-supports, and the cover member is connected to the second support when the first support and the second support are close to each other;

the cover member is connected to the sub-supports through a leather sleeve and is capable of swinging relative to the sub-supports based on a flexible force of the leather sleeve; the cover member is magnetically connected, buckled or adsorbed to the second support, and a front side of the cover member is attached to the second support;

alternatively, the cover member is magnetically connected, buckled or adsorbed to the first support, and a reverse side of the cover member is attached to the first support.

6. The protective cover for electronic devices according to claim 1, wherein the damping member is sleeved on the rotation member, one end of the damping member is connected to the connection member, and the other end is directly or indirectly connected to the rotation member, and applies the damping force to the rotation member;

as an angle between the first support and the second support gradually decreases, the damping member is gradually compressed or twisted, and the damping force exerted by the damping member on the rotation member is increased;

alternatively, as an included angle between the first support and the second support gradually decreases, the damping force exerted by the damping member on the rotation member remains unchanged.

7. The protective cover for electronic devices according to claim 6, wherein the rotation assembly further comprises a locking member, the locking member is sleeved on the rotation member and is rotated with a rotation of the rotation member;

the locking member is arranged on a side of the connection member and arranged corresponding to the connection member, and the locking member is interlocked with the connection member to maintain the angle between the first support and the second support.

8. The protective cover for electronic devices according to claim 1, wherein the connection member is provided with a limit block;

the rotation member passes through the connection member, and a circumferential side wall of the rotation member is provided with a raised block, the raised block and the limit block are at the same side, and the raised block comes into contact with the limit block as the rotation member rotates; and the rotation member is limited by the connection member when the raised block contacts the limit block.

9. The protective cover for electronic devices according to claim 1, wherein the included angle between the first support and the second support is in a range of 0°-360°.

* * * * *